United States Patent [19]

Olschewski et al.

[11] Patent Number: 4,804,276

[45] Date of Patent: Feb. 14, 1989

[54] CAGE FOR A ROLLING BEARING

[75] Inventors: Armin Olschewski, Schweinfurt; Rainer Schürger, Schwanfeld; Robert Stolz; Günter Neder, both of Schweinfurt; Walter Treibel, Salz; Heinrich Kunkel, Schweinfurt, all of Fed. Rep. of Germany

[73] Assignee: SKF GmbH, Schweinfurt, Fed. Rep. of Germany

[21] Appl. No.: 156,712

[22] Filed: Feb. 17, 1988

[30] Foreign Application Priority Data

Feb. 25, 1987 [DE] Fed. Rep. of Germany ....... 3706013

[51] Int. Cl.⁴ ............................................. F16C 33/38
[52] U.S. Cl. .................................................. 384/526
[58] Field of Search ............... 384/526, 528, 534, 523, 384/533, 572

[56] References Cited

U.S. PATENT DOCUMENTS

| | | | |
|---|---|---|---|
| 3,486,212 | 12/1969 | Vannest | 384/523 |
| 4,004,840 | 1/1977 | Johnston et al. | 384/526 |
| 4,702,627 | 10/1987 | Pollastro | 384/526 |
| 4,744,679 | 5/1988 | Verburg et al. | 384/523 |

Primary Examiner—Lenard A. Footland
Attorney, Agent, or Firm—Rosen, Dainow & Jacobs

[57] ABSTRACT

A cage for a ball bearing, especially for an inclined ball bearing, is comprised of two side rings connected together by webs, with one of the side rings being outside of the pitch circle and the other side ring being inside of the pitch circle. Circumferentially resilient axially extending projections are provided extending from one of the side rings toward the other, radially inwardly or outwardly of the pitch circle, and recesses are formed by the webs and projections in the regions of minimum spacing between the balls.

4 Claims, 2 Drawing Sheets

CAGE FOR A ROLLING BEARING

BACKGROUND OF THE INVENTION

This invention relates to cage for a rolling bearing, and more in particular to a cage for an inclined rolling bearing having two side rings interconnected by webs, the two side rings being arranged on opposite sides of the pitch circle.

Cages of this type have been disclosed, for example, in DE-AS No. 17 50 106. In the cage disclosed in this reference the cage webs are greatly stressed by the forces resulting from the different rolling velocities of the balls. These forces act especially in the region of the thinnest web cross section due to the high compression forces resulting from the impacting thereof by the balls.

SUMMARY OF THE INVENTION

The invention is therefore directed to the provision of a cage of the above described type in which the forces acting on the cage webs are elastically braked and the cage is not required to absorb high compressive forces.

In accordance with the invention this object is solved by the provision of a cage wherein axially extending projections are provided extending from one side ring toward the other, either radially inwardly or outwardly of the pitch circle and radially aligned with the webs, the projections being resilient or elastic in the circumferential direction of the cage. In addition, recesses defined by the webs and projections are formed in the region of the cage of the smallest distance between the balls.

BRIEF DESCRIPTION OF THE DRAWING

In order that the invention may be more clearly understood, it will now be disclosed in greater detail with reference to the accompanying drawings, wherein.

DETAILED DISCLOSURE OF THE INVENTION

Figure 1:
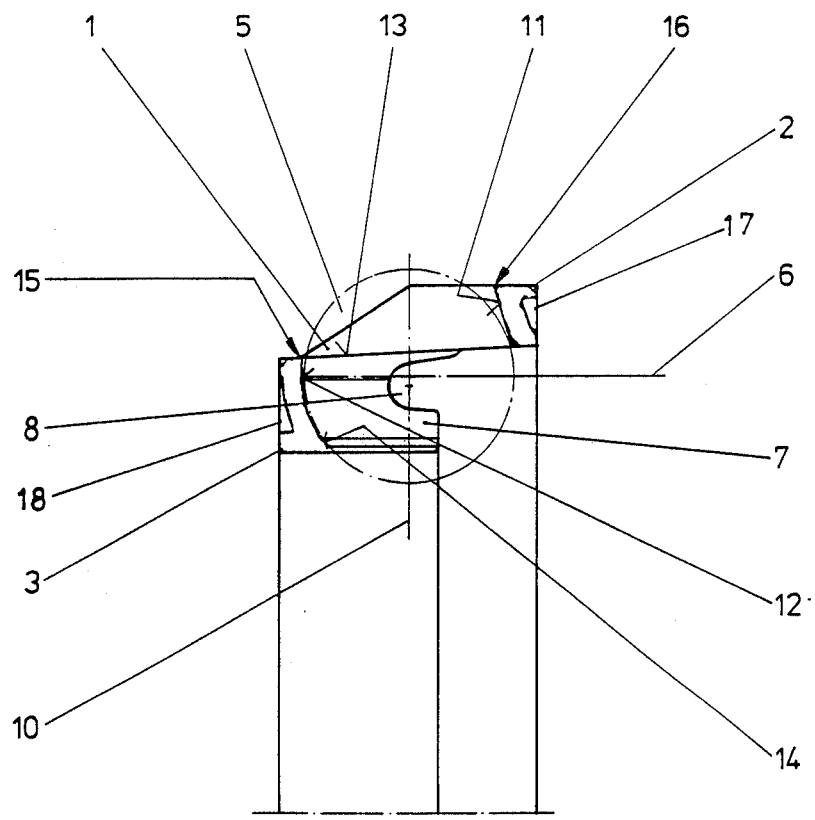
FIG. 1 is a cross sectional view of one half of a plastic cage in accordance with the preferred embodiment of the invention.
Figure 2:
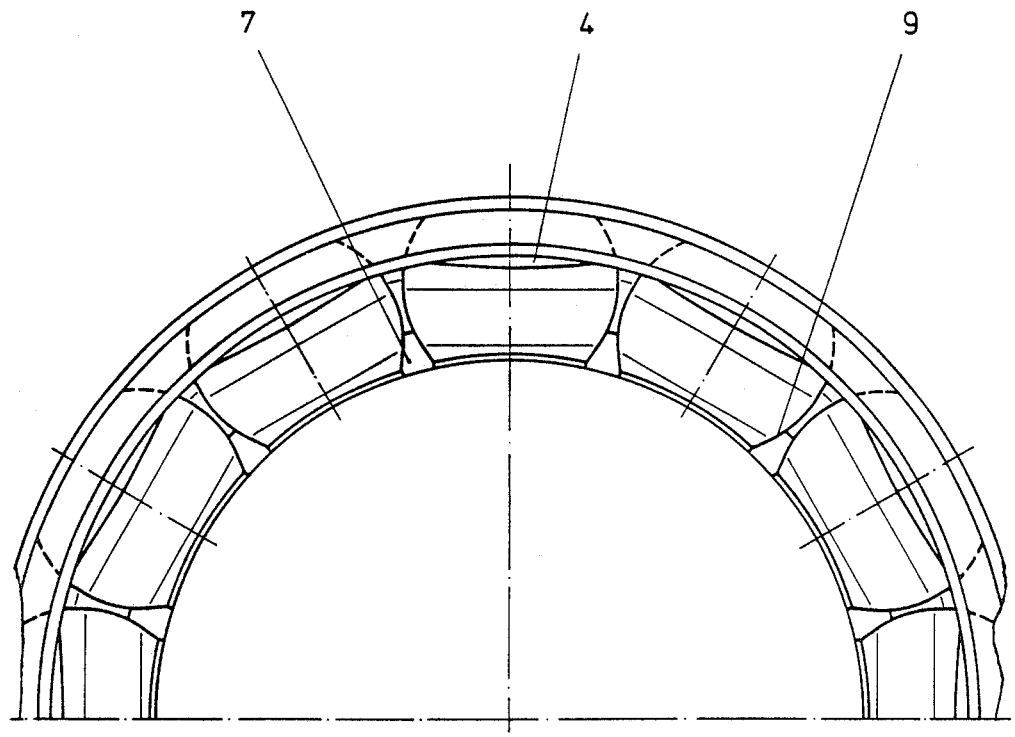
FIG. 2 is a side view of the cage of FIG. 1, taken from the right side thereof.

The plastic cage for inclined rolling bearings in accordance with the invention, as illustrated in the drawings, is adapted to be produced in a casting or extrusion die with slides (not illustrated) that move axially of the cage for opening of the mold. The cage is comprised of two side rings 2,3 interconnected by webs 1 distributed about the circumference of the cage. The webs and side rings define pockets 4 for the reception of balls 5 (shown in dash-dot lines). In the illustrated embodiment, the side ring 2 is radially outwardly of the pitch circle 6 and the side ring 3 is mainly radially inwardly of the pitch circle. Axially extending projections 7 are provided extending axially from the side ring 3 toward the plane of the side ring 2, the projections 7 being radially inwardly of the webs 1 and defining recesses 8 with the webs, the recesses serving as free spaces between the balls. The recesses 8 extend inside and outside of the pitch circle 6. The projections 7 are provided with contact surfaces 9 (FIG. 2) for engaging the balls 5, and project across the radial plane 10 passing through the centers of the balls. The projections are resilient in the circumferential direction of the cage so that the forces resulting from the different rolling velocities of the balls 5 are resiliently evened out. The stability of the whole cage is not affected by the abrasion or other cross section reduction of the projections 7 since the functions of spacing the balls 5 and guiding of the balls in the cage are separated from one another. The guiding of the balls in the cage is achieved by the surfaces 11,12 of the pockets, while the spacing of the balls is accomplished by the projections. Free spaces are produced in the region of the thinnest cage cross section between adjacent balls due to the recesses 8 between the webs 1 and the projections 7. This arrangement thereby prevents the occurrence of high compressive forces on the cage at this position. Due to the provision of the recesses 8 substantially the maximum number of balls 5 can advantageously be mounted in the cage, so that load carrying capacity of the bearing is optimally high. The recesses 8 are possible since the edges 13, which occur as a result of the axial opening of the mold of the two mold or die halves (not illustrated), are radially outwardly of the pitch circle 6. The cross section thickness of the webs can consequently be substantially increased. The cage in accordance with the invention thereby has the advantage that it can be elastically deformed by high pushing or pulling forces and peak stresses are diminished. The pockets 4 have a conical surface 11 on one side and a spherical surface 12 on the other side as well as a conical inner surface 14 inclined at an angle to the bearing axis. As a result of this formation of the cage pockets 4, lubricant in the bearing is not stripped off of the outer ball surfaces. The clear distance between the pocket edges 15,16 is smaller than the diameter of the balls 5, so that the balls must be snapped in the cage pockets 4 with a determined pressure. The side rings of the cage are provided with annular grooves 17,18 extending axially inwardly from their end surfaces. This produces the result that the walls of the side rings 2,3 are of minimum uniform thickness, so that relatively little material is necessary for the production of the cage and rapid cooling of the cage in the casting or extrusion dies is attained.

While the invention has been disclosed and described with reference to a single embodiment, it is apparent that modifications and variations may be made therein, and it is therefore intended in the following claims to cover each such modification and variation that falls within the true spirit and scope of the invention.

What is claimed is:

1. In a cage for a rolling bearing comprised of first and second side rings connected together by a plurality of webs, wherein one of said side rings is outwardly of the pitch circle and the other of the side rings is inwardly of the pitch circle, and the improvement wherein circumferentially elastic projections are provided extending axially from one of the side rings toward the other of the side rings, radially of said webs, and recesses defined by the projections and webs are provided in the regions of the smallest distances between the balls.

2. The cage of claim 1 wherein the projections extend axially across the radial plane of the centers of the balls.

3. The cage of claim 1 wherein the balls engage the circumferentially directed side surfaces of the projections.

4. The cage of claim 1 wherein the side rings of the cage are separated from one another by an edge that is radially displaced from the bearing pitch circle.

* * * * *